United States Patent [19]

Valadez

[11] 4,389,132
[45] Jun. 21, 1983

[54] EYEGLASS PEN CLEANER

[76] Inventor: Alfonso L. Valadez, P.O. Box 4688, San Ysidro, Calif. 92073

[21] Appl. No.: 858,259

[22] Filed: Dec. 7, 1977

[51] Int. Cl.³ .............................................. B43K 29/12
[52] U.S. Cl. ...................................... 401/195; 401/202
[58] Field of Search .................. 401/52, 98, 134, 195, 401/198, 202, 207, 262, 192, 125, 10; 206/233

[56] References Cited

U.S. PATENT DOCUMENTS

| | | | |
|---|---|---|---|
| 1,212,020 | 1/1917 | Contant | 401/195 X |
| 2,908,923 | 10/1959 | Schlechter | 401/10 |
| 2,911,664 | 11/1959 | Zecchini | 401/262 X |
| 3,278,976 | 10/1966 | Ward | 401/202 X |
| 3,552,869 | 1/1971 | Johnson | 401/195 |
| 3,687,561 | 8/1972 | Phillips | 401/134 |
| 3,963,358 | 6/1976 | Houser | 401/195 |
| 4,030,842 | 6/1977 | White et al. | 401/195 |
| 4,053,243 | 10/1977 | Levin | 401/202 |

FOREIGN PATENT DOCUMENTS 1403321  8/1975  United Kingdom ................ 401/195

Primary Examiner—Edward M. Coven
Attorney, Agent, or Firm—Howard I. Podell

[57] ABSTRACT

A cleaner for eyeglasses and other transparent surfaces is provided in the form of a felt tipped pen, and consists of two containers, one holding the felt tip in communication with cleaning solution and the other container serving as a cap and dispenser for wiping material containing a supply thereof and having an opening in one side through which such material may be withdrawn for use in wiping lenses dabbed by the solution-wet tip.

4 Claims, 4 Drawing Figures

EYEGLASS PEN CLEANER

SUMMARY OF THE INVENTION

This invention relates to an eyeglass cleaning device comprising means for applying a cleaning solution and means for wiping same after it has been dabbed on the lenses.

The general prior art to which this invention relates already is aware of U.S. Pat. Nos. 1,523,297; 3,298,502; 2,741,359; 1,406,593; and 2,789,725. The devices proposed by these patents differ in principle of operation and structure from that herein.

The principal object of the invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, wherein like reference character identify the same or like parts:

BRIEF DESCRIPTION OF THE INVENTION

DESCRIPTION OF THE PREFERRED EMBODIMENT

Figure 1:
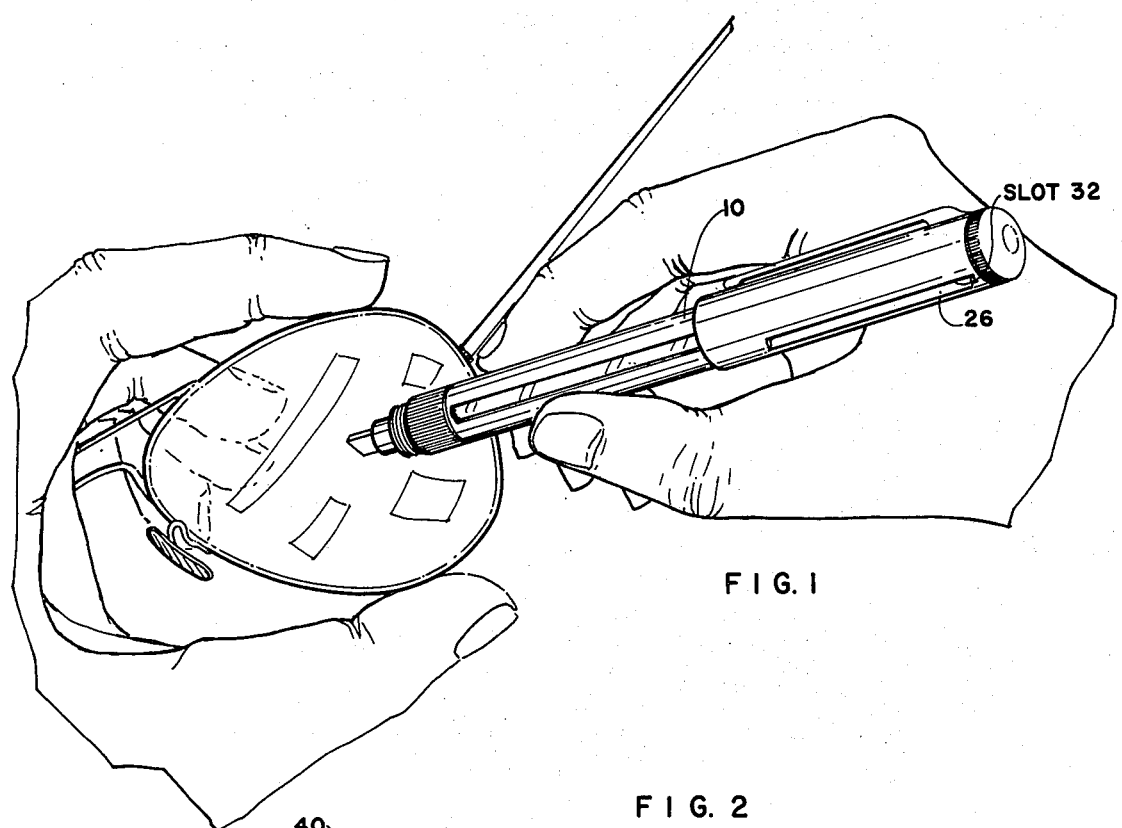
FIG. 1 is a perspective view showing use of the device of the invention.

With reference to the drawing, there is shown and illustrated a pen-type eyeglass cleaner constructed in accordance with the principles of the invention and designated generally by reference character 10.

Figure 3:
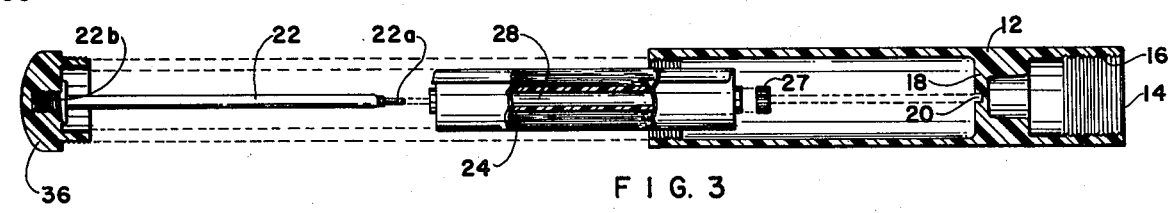
FIG. 3 is a cross-sectional view of the wiper-dispenser unit.
Figure 4:
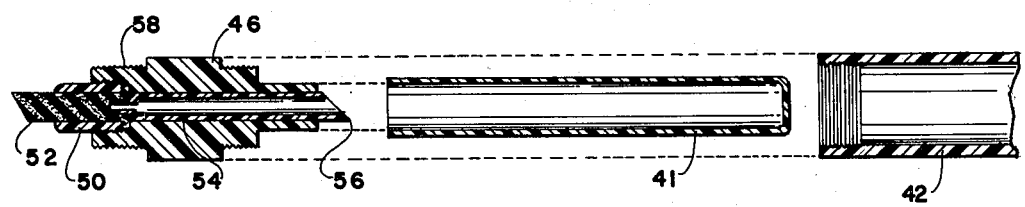
FIG. 4 is a cross-section of the dispenser cleaning solution unit.

This cleaner comprises sheet metal or plastic cap 12 open at one end 14 which is threaded at 16. Spaced inwardly from open end 14 is bearing shoulder 18 formed with central pivot hole 20 (FIG. 3) in which is rotatably mounted one end 22A of shaft 22 on which is rotatably mounted spool 24. Rolled on spool 24 is a sheet of flannel or other wiping cloth 26 suitably 500 mm long, 50 mm wide, and 0.003 mm in thickness. The outer end of material 26 can be withdrawn for use through slot 28 of housing 27 and slot 32 of outer cap 12. The outer end 22B of shaft 22 is threaded to removable closure 36 screwed to cap 12.

As shown, the spool 24 is replaceable by another unit when it is no longer useable by simple removal of closure 36, and removal of knurled nut 27 from thread 25 of pin 22. On its outside, cap 12 has a typical pen holder clip 40.

Figure 2:
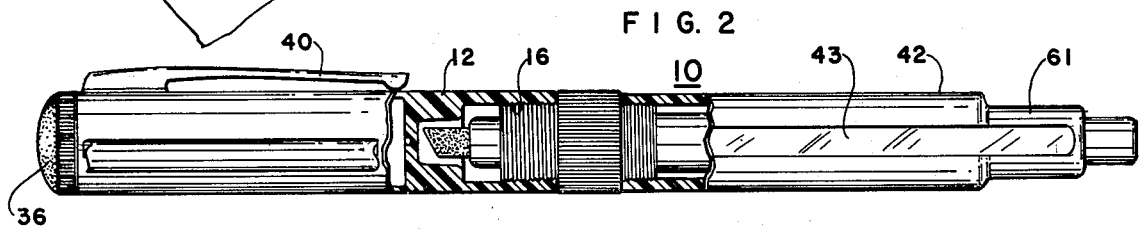
FIG. 2 is a cross-sectional view of the assembled device.

As shown particularly in FIG. 2, the device includes a tubular housing 42 enclosing a cartridge 41 containing a disposable cleaning solution which cartridge 41 is made preferably of clear plastic. Cartridge section 42 is threaded on connecting member 46 which has central bore 48, with transparent cartridge 41 slidably fixed to member 46.

Member 46 holds, force-fitted in an opening of its holding end 50, felt tip 52. Pipe 54 in member 46 has a biased sharp end 56 extending into cartridge 41 supplies cleaning solution to tip 52. The outer end of member 46 is complementarily threaded at 58 to screw in cap 12 when not in use, and similarly threaded at 59 to join to housing 42. The housing 42 is formed with a transparent strip 43 located to permit the viewer to observe transparent cartridge 41.

The outer end 61 of housing 42 is male threaded to engage thread 16 of cap 12 when the felt 52 is exposed.

In other modifications of the invention, the spool is not retractable and has a charge of tissue paper. In throwaway versions of the invention, neither the spool nor the solution container are replaceable. Similarly, maxi-size cleaners can be made for use windshields, and stored in glove compartments.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment set forth, it is to understood that all matter herein set forth or shown in the accompanying drawing is to be interpreted as illustrative and not as in a limiting sense.

Having thus described my invention I claim as new and desire to secure by Letters Patent:

1. An eyeglass lens cleaner formed in the general shape of a pen comprising a cap member and a tubular member, said cap member containing a chamber housing a dispenser of wiping material and having an elongated slot for withdrawing said material therefrom; said tubular member having fixed at a first end thereof a porous tip; said tubular member holding therein a cleaning solution and conveying means intermediate said tip and said container for bringing cleaning solution to said tip, in which said cap member is shaped at a first end with a blind recess, the outer wall of which blind recess is of a shape to matingly detachably fit about alternatively either the first end or the second end of the tubular member such that when the said cap member is fitted about the first end of the tubular member, the porous tip of the tubular member is completely enclosed, such that an end wall bordering said blind recess serves to seal the interior of the blind recess from communication with the chamber housing the wiping materials, wherein the said dispenser consists of a spool rotatably mounted in said chamber of said cap member, with absorbent sheet material rolled on said spool.

2. The cleaner of claim 1 in which the wiping material is a sheet of cloth.

3. The cleaner of claim 2 in which the cloth is of flannel-like material.

4. The cleaner of claim 1 in which the wiping material is of tissue paper.

* * * * *